I. P. TODD.
CAR WHEEL.
APPLICATION FILED MAR. 16, 1909.
929,347.
Patented July 27, 1909.
2 SHEETS—SHEET 1.
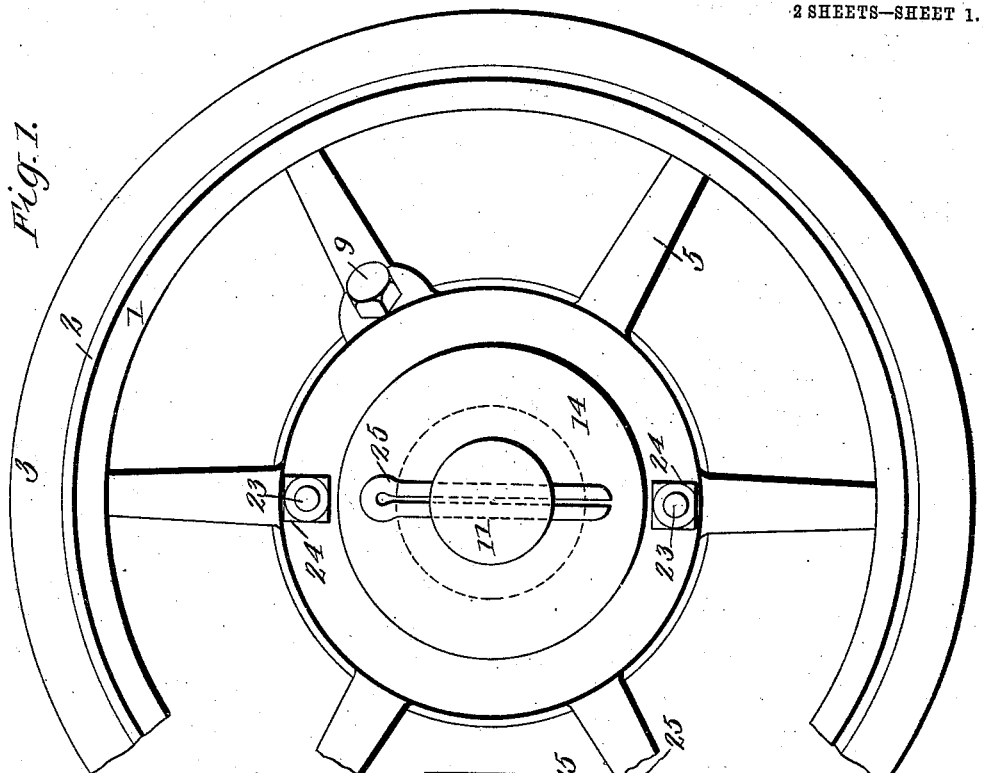
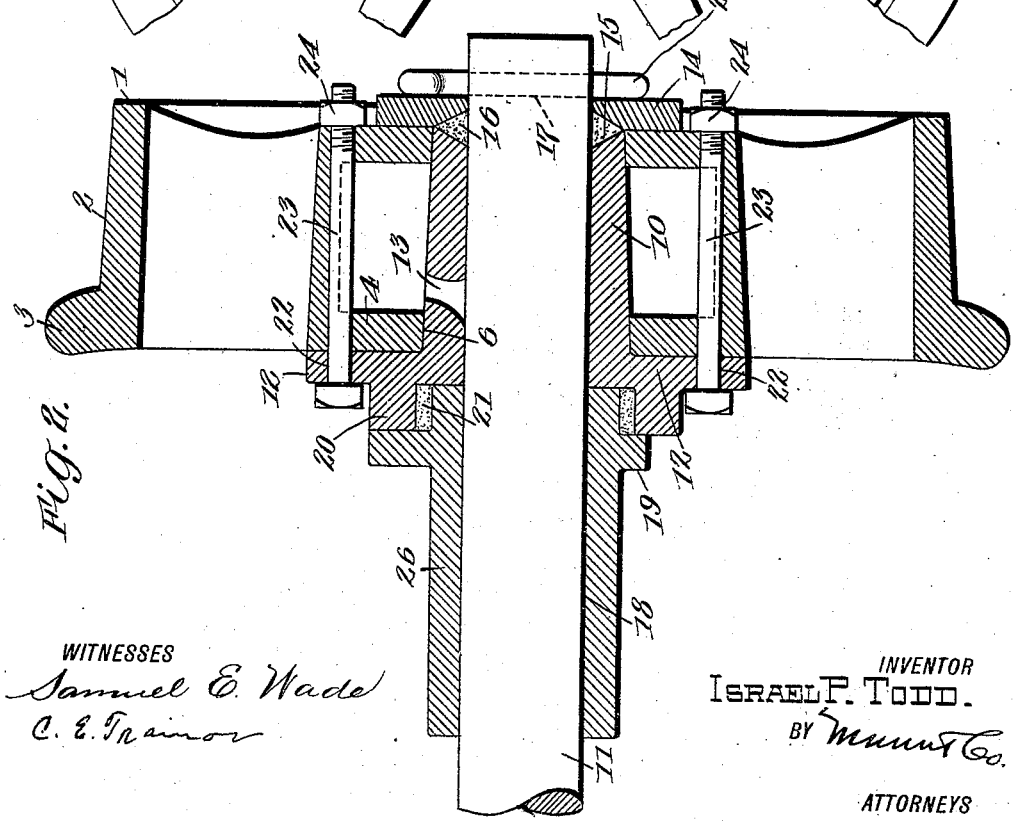
WITNESSES
Samuel E. Wade
C. E. Trainor
INVENTOR
Israel P. Todd.
BY Munn & Co.
ATTORNEYS I. P. TODD.
CAR WHEEL.
APPLICATION FILED MAR. 16, 1909.
929,347.
Patented July 27, 1909.
2 SHEETS—SHEET 2.
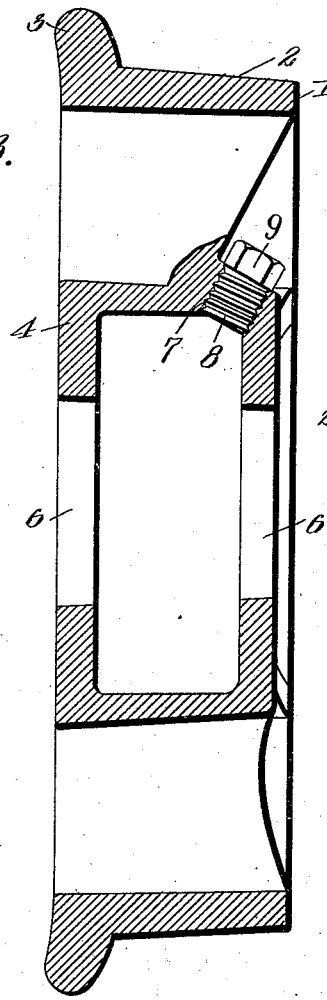
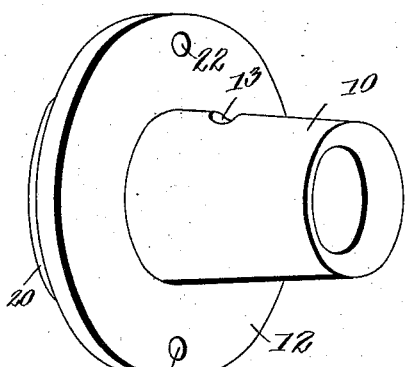
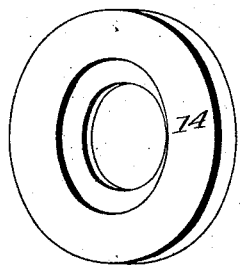
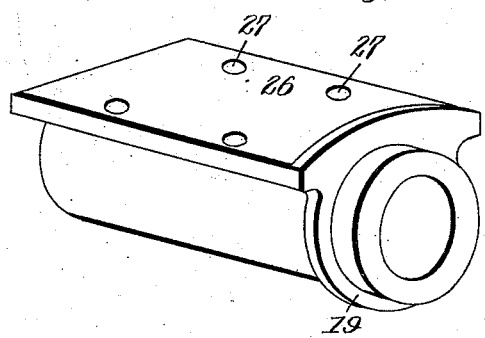
WITNESSES
Samuel E. Wade
C. E. Trainor
INVENTOR
Israel P. Todd
BY Munn & Co.
ATTORNEYS

UNITED STATES PATENT OFFICE.

ISRAEL P. TODD, OF MIDDLESBORO, KENTUCKY.

CAR-WHEEL.

No. 929,347.  Specification of Letters Patent.  Patented July 27, 1909.

Application filed March 16, 1909. Serial No. 483,691.

*To all whom it may concern:*

Be it known that I, ISRAEL P. TODD, a citizen of the United States, and a resident of Middlesboro, in the county of Bell and State of Kentucky, have made certain new and useful Improvements in Car-Wheels, of which the following is a specification.

My invention is an improvement in car wheels, and consists in certain novel constructions and combinations of parts hereinafter described and claimed.

The object of the invention is to provide a wheel especially adapted for mining cars, and provided with a detachable hub, which may be removed when worn out, and replaced by a new one, or should the wheel proper be injured it may be replaced by a new one, using the old hub.

Referring to the drawings forming a part hereof, Figure 1 is a side view of a portion of the wheel; Fig. 2 is a transverse section; Fig. 3 is a similar view, with the axle and hub removed; Fig. 4 is a perspective view of the hub, Fig. 5 is a similar view of the washer, and Fig. 6 is a similar view of a boxing for connecting the axle with the car.

The embodiment of the invention shown, consists of a wheel proper composed of a rim 1, provided with a tread 2 having at one side a flange 3, and a hollow cylindrical casing 4 connected with the hub by spokes 5, the rim, spokes, and casing being preferably integral and cast in a single piece.

The casing is provided with opposite axial openings 6, for a purpose to be presently described, and with an internally threaded opening 7, normally closed by a screw threaded plug 8, having a polygonal head 9, for engagement by a wrench to remove and replace the plug.

The hub has its outer surface tapering or conical, while its bore is cylindrical for closely engaging the axle 11. The hub is provided at its larger end with an annular flange 12, which is adapted to fit closely against that face of the casing toward the car, and an opening 13 traverses the hub putting the inside thereof into communication with the interior of the casing.

It will be noticed from an inspection of Fig. 3, that the outer opening 6 of the casing is of somewhat less diameter than the inner opening, and the hub fits closely in the said openings as shown in Fig. 2.

The outer or small end of the hub is beveled inwardly as shown in Figs. 2 and 4, and a washer 14 encircles the projecting end of the shaft 11, fitting closely against the casing and the inner edge of the washer opening is beveled as at 15, the bevel of the washer and the hub coöperating to form a recess for receiving a packing 16.

A sleeve 18 fits on the axle inside of the wheel, the outer end abutting against the inner side of the casing, and the sleeve is provided with an annular flange 19, which engages an annular rib 20, projecting from the flange 12 of the hub, the interior diameter of the rib being slightly greater than the external diameter of the flange, so that an annular space is formed between the rib, the sleeve, the flange of the sleeve and the end of the hub, in which is received a packing 21.

The flange 12 of the hub is provided at diametrically opposite points with transverse openings 22, which register with transverse openings through the casing, and bolts 23 are passed through the registering openings, and are secured in place by nuts 24 which secure the hub in place, and press it tightly into the openings of the casing.

The sleeve 18 is fitted onto the shaft and limits the inward movement of the hub, while a cotter pin 25 is passed through a transverse opening in the end of the shaft and rests against the outer face of the washer to retain the wheel on the axle. The sleeve 18 is provided on its upper surface with an integral flat plate 26, provided with openings 27, and the car body seats upon the plate and is secured thereto by bolts traversing the openings and the car body. A lubricant may be placed in the casing by removing the plug 8, and by means of the opening 13, the lubricant can reach the surface of the axle.

When a hub becomes worn and it is desired to remove the same and insert a new one, the nuts 24 are loosened, the cotter pin is removed and the hub is removed from the casing and replaced by a new one, after which the nuts are replaced and tightened, the wheel is placed on the axle and the cotter pin is again inserted in its opening.

It will be evident from the description, that when the nuts are tightened on the bolts and the flange 12 is drawn tightly against the face of the casing, a practically integral wheel is formed, while at the same time the hub is easily removed when necessary.

I claim:

1. In a device of the class described, the combination with the axle, of a wheel of the class described, comprising a rim, and a cylindrical casing concentric with the rim and connected thereto, said casing having an axial opening therethrough and tapering from the inner surface of the wheel to the outer, a hub having a tapering outer surface to fit the opening, and a cylindrical bore for receiving the axle, said hub having its small end beveled toward the bore, and provided at its larger end with a flange fitting against the casing, said casing and flange having registering openings, and bolts traversing the openings for securing the hub in place, a bearing on the axle abutting against the end of the hub, said flange having an annular rib spaced apart from the bearing, a packing between the rib and the bearing, the bearing having a flange abutting against the rib, a washer on the outer end of the axle and resting against the casing, said washer having the inner edge of the opening beveled, and coöperating with the bevel of the hub to form a recess, a packing in the recess, and a pin traversing the axle for retaining the washer in place.

2. In a device of the class described, the combination with the axle, of a wheel comprising a rim and a cylindrical casing concentric therewith and connected thereto in spaced relation, said casing having an axial opening which tapers from the inner surface of the wheel to the outer, a hub having a tapering surface to fit the opening and a cylindrical bore for receiving the axle, said hub having a flange fitting against the casing, means for securing the flange to the casing, a bearing on the axle abutting against the end of the hub, said flange having an annular rib spaced apart from the bearing for receiving a packing between the rib and the bearing, said bearing having a flange abutting against the rib to close the space between the rib and the bearing.

3. In a device of the class described, a wheel consisting of a rim and a cylindrical casing concentric therewith and connected thereto in spaced relation, said casing having a tapering axial opening therethrough, a hub having an outer surface to fit the opening and a cylindrical inner surface, said hub having its small end beveled toward the bore, a washer encircling the opening of the hub and resting against the end thereof and having its inner edge beveled and coöperating with the bevel of the hub to form a recess for receiving a packing.

4. In a device of the class described, a wheel comprising a rim and a cylindrical casing having an axial opening for receiving an axle, a hub within the opening and having at one end an annular rib, a bearing for encircling the axle abutting against the end of the hub and having its outer surface spaced apart from the rib to form an annular space between the rib and the outer face of the bearing, said bearing having an annular flange abutting against the end of the rib for closing said annular space.

ISRAEL P. TODD.

Witnesses:
J. R. SAMPSON,
WM. SAMPSON.